R. E. HELLMUND.
DYNAMO-ELECTRIC MACHINE.
APPLICATION FILED JAN. 26, 1917.
1,431,952.
Patented Oct. 17, 1922.
2 SHEETS—SHEET 1.
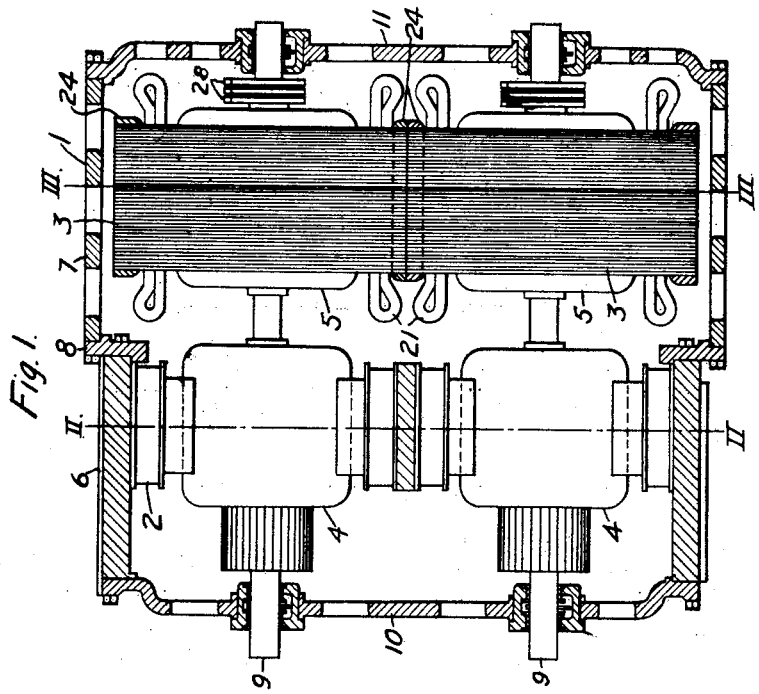
Fig. 1.
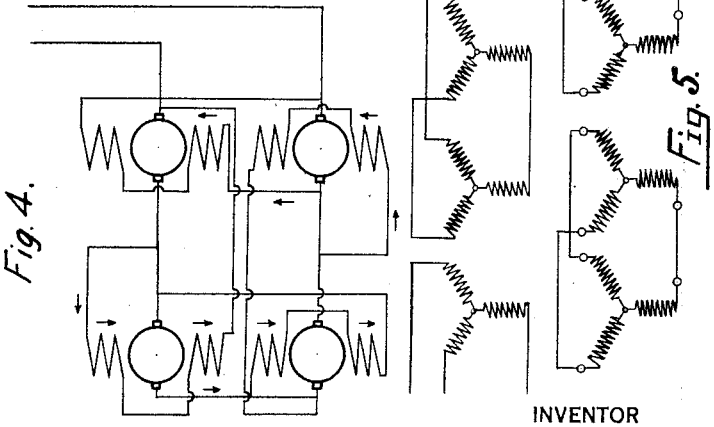
Fig. 4.
Fig. 5.
WITNESSES:
Ed Plinke.
W.C.M⸰Coy.
INVENTOR
Rudolf E. Hellmund.
BY
Wesley G. Carr
ATTORNEY R. E. HELLMUND.
DYNAMO-ELECTRIC MACHINE.
APPLICATION FILED JAN. 26, 1917.
1,431,952.
Patented Oct. 17, 1922.
2 SHEETS—SHEET 2.
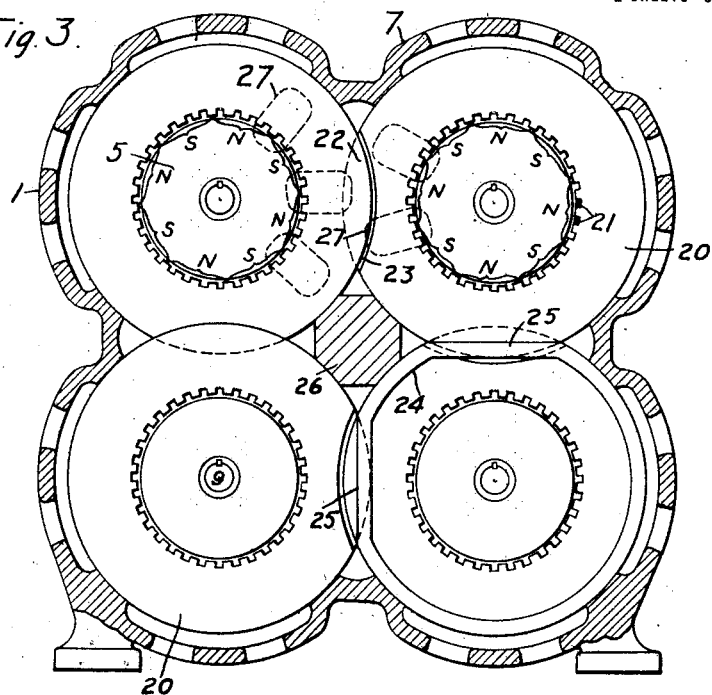
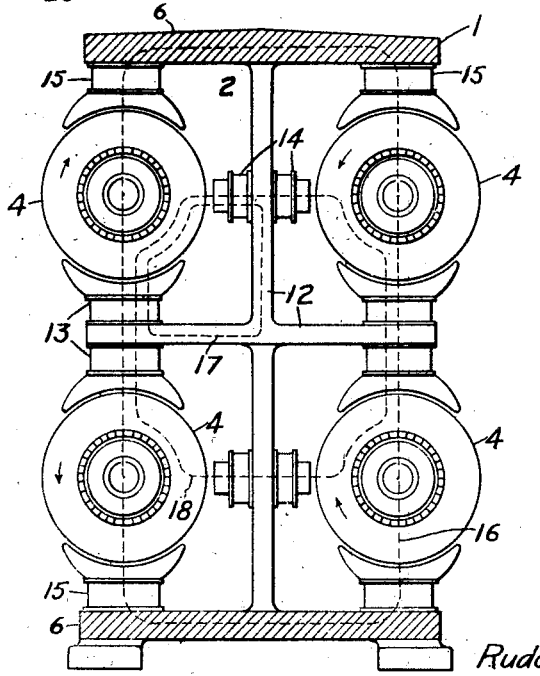
WITNESSES:
Ed Plinke.
W. C. McCoy.
INVENTOR
Rudolf E. Hellmund
BY
Wesley L. Carr
ATTORNEY Patented Oct. 17, 1922.

1,431,952

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

Application filed January 26, 1917. Serial No. 144,664.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Dynamo-Electric Machines, of which the following is a specification.

My invention relates to dynamo-electric machines and particularly to a compact arrangement for a motor-generator set embodying a plurality of generating units.

The object of my invention is to provide a machine of the above-designated character which shall be particularly light and compact in structure and have readily accessible parts and in which relatively large portions of the generating units shall be exposed to the outside atmosphere.

Heretofore, it has been proposed to mount a plurality of rotatable armatures in a single fame. According to my invention, I provide a structure in which a plurality of motor armatures are each connected to a generating armature and all of the armatures are mounted within a single frame.

Fig. 1 of the accompanying drawings is a view, partially in section and partially in side elevation, of a dynamo-electric machine constructed in accordance with my invention; Fig. 2 is a view, partially in section and partially in end elevation, of the generator armatures taken on the line II—II of Fig. 1; Fig. 3 is a sectional view of the motor amatures taken on the line III—III of Fig. 1; Fig. 4 is a diagrammatic view of a system of excitation for the generator portion of the dynamo-electric machine shown in Fig. 2; and Fig. 5 is a diagrammatic view of the motor connections.

The dynamo-electric machine shown in Fig. 1 of the drawings comprises a frame 1 having a plurality of field-magnet structures 2 and 3 and a plurality of sets of armatures 4 and 5 rotatably mounted within the frame 1. The frame 1 comprises a generator portion 6, in which the generator armatures 4 and the field-magnet structures 2 are mounted, and a motor portion 7 that is joined to the generator portion 6 by a plate 8 and encloses the motor parts 3 and 5. Each of the sets of armatures 4 and 5 is mounted upon a single shaft 9 which is rotatably mounted in end members 10 and 11. The armatures 5 are preferably of a wound-rotor type and are adapted to be operated by alternating currents. The armatures 4 are individually driven by the armatures 5 and are of a type adapted to generate direct currents.

A sectional view of the generator portion of the dynamo-electric machine taken on the line II—II of Fig. 1 is shown in Fig. 2. A supporting structure 12, by means of which a plurality of main pole pieces 13 are held in operative relation to the armature members 4 and auxiliary pole pieces 14 are positioned between adjacent armatures 4, is mounted within the frame portion 6. Corresponding main pole pieces 15 are directly supported by the frame 6.

The main magnetic flux for a plurality of armatures and pole pieces, grouped as shown in Fig. 2, will thread all of the armatures and main pole pieces in series-circuit relation and will pass through the end portions 6 of the frame 1 as indicated by the dotted line 16 of Fig. 2. Since the main magnetic flux passes through all of the armatures, there will be a strong tendency for each of them to furnish the same voltage.

The magnetic-flux for the auxiliary pole pieces 14 passes through the supporting frame 12, as indicated by the dotted line 17 of Fig. 2, when all of the armatures are rotated in the same direction, or a single magnetic flux may be provided which threads all of the armatures and the auxiliary pole pieces in series-circuit relation when the adjacent armatures are operated in opposite directions. This latter desirable path for the magnetic flux is indicated by the dotted line 18 of Fig. 2. Such a structure as that illustrated in Fig. 2 may obviously be mounted in a separate frame and may be employed as either a motor or a generator unit.

Fig. 3 is a sectional view taken on the line III—III of Fig. 1 and illustrates the construction of the motor portion of the dynamo-electric machine. The field-magnet structure 3 for the motor portion of the dynamo-electric machine comprises a plurality of core parts 20 that are mounted within the frame portion 7 and are each provided with a field-producing winding 21. The motor armatures 5 are respectively mounted in alinement with the corresponding generator armatures 4, being placed upon the same shafts and, in order to secure as compact a motor structure as the generator structure shown in Fig. 2, certain portions 22 of the core parts 20 are caused to overlap the adjacent core parts. The field-magnet structure 3 is composed of annular disks or laminations, each having a small portion 23 cut from one side thereof, which are assembled between end rings 24. The structure is built up by placing one lamination upon each of the core parts 20 in a given order and turning each disk through substantially ninety degrees relative to the preceding disk in order that the cut-out portion 23 of each disk may accommodate the overlapped portion 22 of the adjacent disk and provide a core structure of uniform thickness. Each of the end rings 24 is provided with flat sides 25 to accommodate the adjacent rings 24 which must be used to hold the field-magnet core structure 3 in place. A central brace 26 provides means for centering the laminations and for clamping the inner portions of the rings 24 in place. If it is desired to construct the field magnet 3 from single-piece laminations from which four armature openings are punched, the brace 26 may be omitted.

Each of the windings 21 is adapted to produce a number of magnetic poles around the inner periphery of the core parts 20, as indicated by the dotted lines 27 of Fig. 3, which represent the mean magnetic path of the flux from adjacent magnet poles. In order that the portions 22 of the adjacent core parts 20 shall not become magnetically saturated, the main magnetic path of the magnet poles for one core is disposed between adjacent magnetic paths of the adjacent core, as illustrated in Fig. 3. This arrangement of the exciting windings 21 minimizes the iron losses in the portion 22 of the magnet structure 3 since the variations in the magnetic flux for this portion of iron will be less than the variations occurring in iron serving for only a single armature.

The armatures 5 are preferably of a wound-rotor type having a plurality of slip rings 28 for the rotor current. Motors of the wound rotor type may be operated in cascade relation in order to secure particularly valuable operating characteristics for the assembled dynamo-electric machine. All of the motor units may be connected in cascade relation as shown in Fig. 5 or each pair of motor units may be connected in cascade relation and the groups connected in parallel. By operating the driving motors in cascade relation, equal torques are delivered to the generator armatures and, therefore if one of the armatures 4 should flash over, thus increasing the current and torque thereof, the speed of its driving motor would immediately drop, thus reducing the voltage across the armature terminals and extinguishing the arc without serious damage to the motor and without interrupting the generator circuit. The generators will also be protected from short-circuits or other abnormal conditions requiring a greatly increased driving torque. It should be understood, however, that other driving means delivering a constant torque could be employed without departing from my invention.

Fig. 4 illustrates an excitation system for the series of direct-current generating armatures. Each of the armatures produces the excitation for the adjacent armature. Although the common flux through the common field frame tends to cause the generators to produce equal voltages, it is, nevertheless, possible that certain differences of field strength may exist between the four armatures, on account of flux leakage caused by slight variations in the reluctance of the various portions of the path. If such a condition should exist, so that one generator produces a higher voltage than does the others, this increased voltage tends to increase the field strength of the generator whose field it energizes. This, in turn, raises the voltage of another armature, and so forth, causing a strong tendency towards voltage equalization, which, with equal currents from the various machines, tends to give equal power outputs. All four generators being similar, having the same voltage and being connected to the same load circuit, they would tend to produce equal currents. While increasing the field current of one of the generators will increase the flux common to all four machines, it will, nevertheless, increase the flux through the one machine more than through the others on account of the same leakage which orginally caused the generator in question to produce a lower voltage than did the other generator. Obviously, this equal-load distribution without the use of intermediate gears or other mechanical connecting devices will produce a very efficient and quietly-operating generating unit for high potential currents.

It should be particularly noted that a very large portion of the surface of each of the generating armatures is exposed to the outside atmosphere, thereby constituting a ventilating system which should effectively cool the armature parts and should permit of the operation of these units to their fullest capacity. Furthermore, the magnetic circuit of these units is such as to require a minimum amount of magnetizing material and, in view of this, the frame work and the supporting structures may be made as small as is consistent with the proper mechanical strength for such parts. The assembled unit of driving motors will be seen to be very compact and to occupy a relatively small space and also to have a very large portion of the active iron surface exposed to the outside atmosphere. The method of assembling the core structure by cutting away a portion from each of the laminations will enable the cores to be placed as closely together as the essentially more compact direct-current generating units.

Although this machine is described as a unitary dynamo-electric machine, the structure proposed for the driving motors or for the generating units could be used separately for a number of other purposes. I desire, therefore, that only such limitations shall be imposed as are set forth in the appended claims.

I claim as my invention:

1. In a dynamo-electric machine, the combination with a frame, of a plurality of mechanically-independent motor armatures mounted within said frame, a corresponding number of mechanically-independent generator armatures mounted within said frame and mechanically connected to said motor armatures, and means whereby the field winding of each generator is excited by current from another of said generators.

2. In a dynamo-electric machine, the combination with a unitary frame structure, of a plurality of direct-current type of armatures mounted within said frame, and a plurality of induction motors for driving said armatures mounted within said frame.

3. In a dynamo-electric machine, the combination with a frame, of a plurality of direct-current type of armatures mounted within said frame and having a common main magnetic circuit, and a plurality of induction motors mounted within said frame for driving said armatures, each of said induction motors having an individual magnetic circuit.

4. In a dynamo-electric machine, the combination with a unitary frame structure, of a plurality of mechanically-independent motor armatures mounted within said frame, and a plurality of mechanically-independent generator armatures mounted within said frame, each of said motor armatures being adapted to drive one of said generator armatures.

5. A dynamo-electric machine comprising a frame, a plurality of annular laminated cores positioned in said frame, and armatures rotatably mounted in said cores, each of said cores having a portion of its laminations interleaved with an adjacent core.

6. A dynamo-electric machine comprising a frame, a plurality of laminated cores positioned within said frame, and armatures positioned within said cores, each of said cores having parts in common with the adjacent cores.

7. A dynamo-electric machine comprising a frame, a plurality of laminated cores positioned within said frame, and armatures positioned within said cores, each of said cores having parts in common with the adjacent cores, said cores being provided with magnetizing windings, the magnetic flux produced in said common core-part by one of said windings having a flux path interposed between the adjacent flux paths of a corresponding adjacent core.

8. A dynamo-electric machine comprising a frame, a core member mounted within said frame, and a plurality of armatures rotatably mounted within said core member, said armatures being so energized that the major portion of the magnetic field flux through each of them occupies the same portions of said core member alternately.

9. A dynamo-electric machine comprising a frame, a plurality of armatures and a plurality of pole pieces disposed within said frame, a single magnetic circuit for all of said pole pieces, each of said pole pieces having a magnetizing coil, and connections whereby the magnetizing coil associated with one of said armatures is excited from another of said armatures.

10. In a dynamo-electric machine, the combination with a frame, of a plurality of generator armatures mounted within said frame, and a plurality of driving motor armatures mounted within said frame and adapted to individually drive said generator armatures, said motor armatures being adapted to exert substantially the same torque upon each of said generator armatures.

11. In a dynamo-electric machine, the combination with a unitary frame structure, of a plurality of generator armatures mounted in said frame, and a plurality of induction motor armatures mounted within said frame and adapted to individually drive said generator armatures, said motor armatures being of a wound-rotor type adapted to be operated by alternating-currents.

12. In a dynamo-electric machine, the combination with a frame, of a plurality of generator armatures mounted in said frame, and a plurality of motor units for individually driving said generator armatures, said motor units being of a wound-rotor type adapted to be operated by alternating current and certain of said motor units being connected in cascade relation.

13. In a dynamo-electric machine, the combination with a frame, of a plurality of generator armatures of the direct-current type mounted within said frame and having a common main magnetic circuit, and a plurality of driving motors of the induction type mounted within said frame and adapted to individually drive said generator armatures, said generator armatures being connected to one load and said motors being connected in cascade.

In testimony whereof, I have hereunto subscribed my name this 20th day of January, 1917.

RUDOLF E. HELLMUND.